March 17, 1959  D. I. BOHN  2,877,663

RADIAL ENGINE-MASTER CRANK PIN BEARING ASSEMBLY

Filed June 18, 1954

INVENTOR.
DONALD I. BOHN
BY
Ostrolenk & Faber
ATTORNEYS

United States Patent Office
2,877,663
Patented Mar. 17, 1959

2,877,663
RADIAL ENGINE-MASTER CRANK PIN BEARING ASSEMBLY

Donald I. Bohn, Pittsburgh, Pa.

Application June 18, 1954, Serial No. 437,791

4 Claims. (Cl. 74—580)

My present invention relates to four cycle radial internal combustion engines and to other radial internal combustion engines having an odd number of cylinders and more particularly to novel means for maintaining the master crank pin bearing assembly at a fixed angular orientation while nevertheless it has its normal gyratory or translatory motion.

Radial engines adapted primarily for two cycle operation are known as shown in Bohn application Serial No. 197,371 filed November 24, 1950 for Radial Engine. However, a four cycle radial engine must have an odd number of cylinders. For this purpose means must be provided for varying the center distance of the restraining link shown in the said device so that the master crank pin bearing assembly there shown and hereinafter described will maintain a constant orientation and will not shift as the operating cycle of the four cycle radial engine proceeds around the crank pin.

A brief review of radial engines and their operating principles will aid in understanding my specific novel device.

The conventional airplane engine of radial construction employs one master rod for each bank of cylinders. This master rod resembles an ordinary connecting rod in that it has a wrist pin at one end and a crank pin bearing at the other end. In addition, the crank pin bearing has a number of knuckle pins to which are fastened connecting rods going to all of the pistons except the one connected directly to the master rod.

This method has the decided advantage of being light and economical both as to space and cost. It does, however, introduce unbalanced dynamic forces in the engine of such characteristics that they cannot be readily balanced out or their effect eliminated by any known scheme or the employment of additional devices.

In order to use the general design of the radial engine for large stationary engines, it has been deemed advisable to eliminate the inherent unbalance resulting from the conventional single master rod. This, up to the present time, has been performed in the following ways:

(1) The master crank pin bearing assembly carries knuckle pins for all of the cylinders. Such a construction by itself is unstable and four gears arranged in planetary fashion are employed to prevent undesirable rotation in either direction of this master assembly.

(2) A scheme involving three floating links employed in the Sharpe Patent No. 2,264,484.

(3) Schemes involving various linkages.

(4) My above-mentioned application.

The planetary gear scheme provides excellent balance and operational characteristics. It is, however, very expensive involving four high-quality precision gears and is susceptible to severe trouble or damage in the event of bearing failure.

The design of the Sharpe patent while less expensive involves elements which are susceptible to undesirable damage due to the extraordinary loading on the bearings in the event of a failure of a main or crank pin engine bearing.

Link connections, where they have been used, have extended around the entire bearing, thereby necessitating an increase in radial size of the engine or requiring a comparatively weak link.

The primary object of my invention is, in a four cycle internal combustion radial engine or in any other radial engine requiring an odd number of cylinders, to so arrange the connection that no mechanical ties are provided between the master crank pin bearing assembly and any part of the engine frame or crank case.

In addition, an essential object of my invention is, in a radial engine requiring an odd number of cylinders, to mount a connecting link in such manner that it will always maintain its original orientation.

Thus, no excessive loading will occur on any of the parts either in operation or in the event of a failure of any of the elements.

This lack of connection to stationary parts of the engine obviates the objections of the devices previously used and provides a novel, useful and inexpensive apparatus for maintaining the angular position of the master bearing.

Essentially, my invention contemplates a radial engine in which two opposite knuckle pins in the master bearing are each provided with crank elements, the crank elements having journals which are interconnected by a rigid tie link, the rigid tie link being split and having a central opening which will clear the crank pin and permit unimpeded rotation of the crank pin. The link is displaced axially of the bearing so that it need only pass around the crank pin and not around the bearing, thereby making it possible to obtain an extremely strong link without increase in the radius of the engine as a whole.

The link, the two knuckle pin cranks and the two knuckle pins tied together provide a simple linkage to cause the angle of the two master connecting rods with respect to the master bearing to remain always at the same value, thereby preventing any change in the orientation of the bearing on its own axis while it is going through its gyratory or translatory motion.

In addition, my invention contemplates a subsidiary linkage including a crank at one end of the main link, a crank at one of the knuckle pins (not originally connected to the main link) and a subsidiary link between the said cranks so that in a radial engine having an odd number of cylinders, change in the orientation of the bearing on its own axis while it goes through its translatory movement will be prevented.

Another object of my invention is, therefore, the utilization of a simple floating linkage cooperating with a pair of opposite master connecting rods to cause the angle of these rods with respect to a diameter of the master bearing to remain identical at all positions of the bearing.

The foregoing and many other objects of my invention will become apparent in the following description and drawings in which.

Referring to the figures, the crank shaft 21 is provided with an upper main journal 20 and a lower main journal 22, both of these journals operating on conventional bushings or bearings which are not shown but which are well understood in the art of radial engines.

Figure 1:
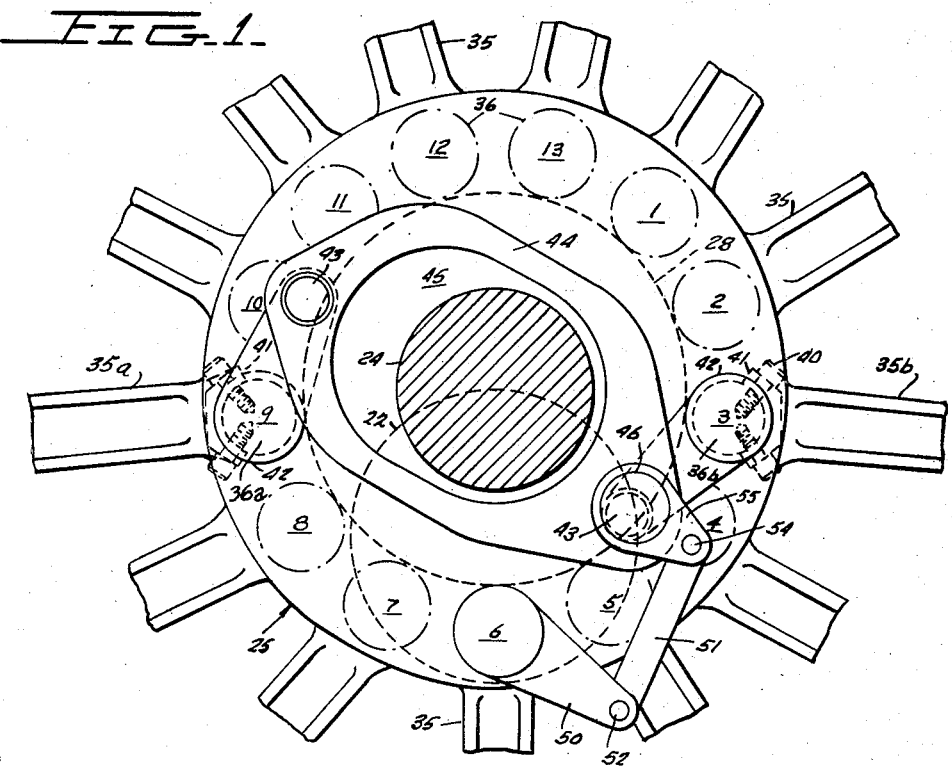
Figure 1 is a cross-sectional view through a radial engine utilizing my novel linkage and taken from line 1—1 of Figure 2 looking in the direction of the arrows.
Figure 2:
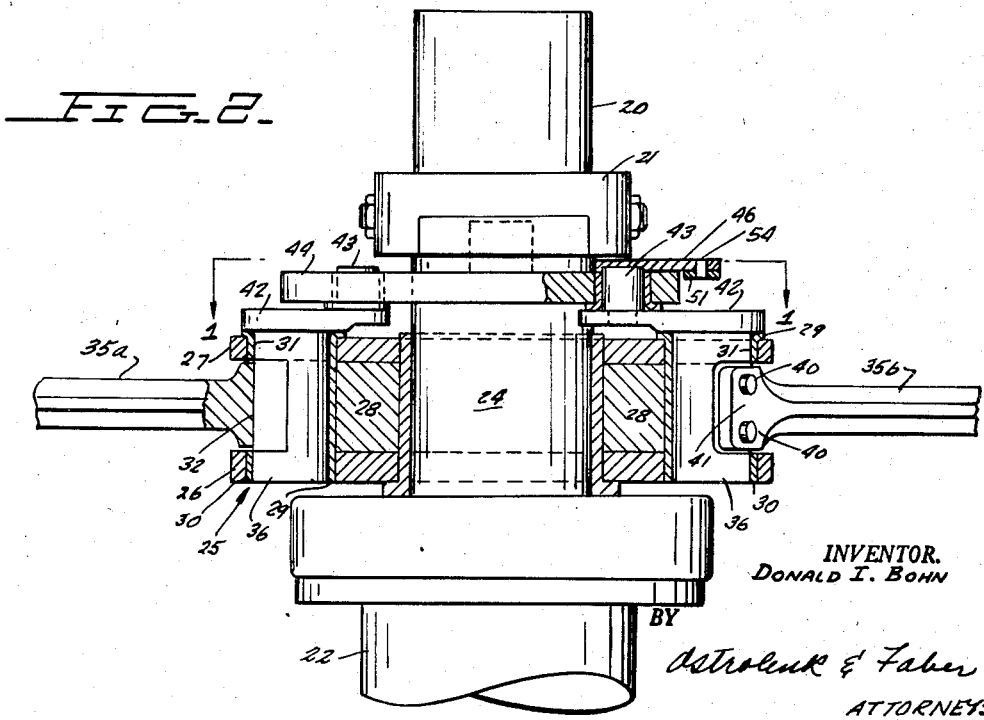
Figure 2 is an elevation of my novel radial engine with the individual pistons and cylinders cut away since the arrangement of these elements is well known in the art.

In line with the journals 20 and 21 in Figure 2 is the crank pin 24. The crank pin 24 between these journals happens to be shown in line with them because of the particular view selected in Figure 2. Actually the crank pin 24 is offset from these journals as shown in the cross-sectional view of Figure 1.

The offset of the crank pin 24 is the principal element which, of course, causes the entire crank shaft to rotate in response to the operation of the various pistons and cylinders and thereby transmit power in the form of rotary motion.

The master crank pin bearing assembly 25 comprises a pair of circular discs 26 and 27 having in its central portion crank pin bushings 28 and knuckle pin bushings 29 extending adjacent the periphery.

The engine here shown is a thirteen cylinder unit intended to have thirteen knuckle pins and, therefore, being provided with thirteen knuckle pin bushings 29. The knuckle pin bushings 29 are mounted and secured in position in appropriate openings 30, 31 in the plates 26 and 27 of the crank pin bearing assembly 25. Knuckle pin bushings 29 are cut away at 32 to provide a longitudinal slot directed toward the outer periphery of the crank pin bearing assembly 25 to permit each of the thirteen connecting rods 35 to be bolted to the knuckle pin 36 mounted in the knuckle pin bushing 29.

The method of connection to the knuckle pin 36 is particularly shown in the figures for cylinder connections 3 and 9. The rods 35 are each connected to their knuckle pin 36 by means of four cap screws 40 passing through flanges 41 at the ends of the connecting rods 35 and into the knuckle pin 36, the opening 32 being sufficiently wide to permit this connection to be made.

The basic principle of the present invention provides for the interconnection of two knuckle pins so that they are integrated and must always remain at the same angle to each other. For best results two radially opposite knuckle pins are thus integrated as, for instance, the knuckle pins for cylinder positions 3 and 9 in the figures.

Consequently, the knuckle pins 36 for cylinders 3 and 9 in the figures differ from the other knuckle pins for cylinders 1, 2, 4 to 8 and 10 to 13 only in their integration with each other. Otherwise their operation is the same.

The knuckle pins 36a for cylinder 9 and 36b for cylinder 3 are each provided with a horizontal crank member 42, 42 integral therewith and, of course, extending at right angles thereto. Each of the horizontal crank members 42, 42 is provided with a journal 43, 43. Rigid connecting link 44 is provided between the journals 43, 43 the said connecting link 44 being split so that it may be fastened around the crank pin 24 and having an elongated hole 45 in its center to permit full operation of the crank pin 24.

Link 44 is displaced axially of the bearing, thereby permitting the curvature of the arc in the link to be greatly reduced so that it will pass over the crank only without having to pass around the entire bearing.

The positioning of the link 44 in my invention so that it extends around the crank pin rather than around the bearing permits the link to be widened as much as may be necessary to resist all compressive loads or thrusts without going beyond the confines of the machine where it may interfere with the cylinders.

Such an increase in width would only require a corresponding lengthing of the eccentric portion of the crank shaft, that is crank pin 24, since in most engines some slight longitudinal lengthening can be done without increases in overall size, while radial lengthening requires a complete redesign of the machine.

The purpose of the link 44 is to tie together the crank members 42, 42 for the knuckle pins 36a and 36b; and the hole 45 is sufficiently large so that this tie can be obtained to ensure a fixed alignment with the center of rotation for the pins of cylinders 3 and 9 and hence for all the cylinders without touching or rubbing the crank pin 24.

During the course of rotation of the engine, all of the connecting rods 35 naturally vary their angle with respect to the knuckle pins and the master crank pin bearing assembly 25 in accordance with the rotation of crank pin 24 imparted thereto by the successive operation of the cylinders of the engine.

It will be understood, since it is well known, that each of the connecting rods 35 is connected to a piston which in turn is mounted in a cylinder, the pistons being driven in appropriate sequence by methods well known in the art of internal combustion engines.

As previously pointed out, the principal element in the operation of a radial engine of this type is to ensure that the master crank pin bearing assembly 25, while it has translatory movement, does not rotate in any geographical sense, in other words, that any portion of master crank pin bearing assembly 25 which is pointing north at the beginning of the cycle should be directed in the same north direction at all portions of the cycle although the master crank pin bearing assembly 25 does have translatory motion in response to the operation in sequence of the pistons and connecting rods.

While heretofore this operation was performed either by securing one of the connecting rods rigidly to the master crank pin bearing assembly or by a plurality of linkages in quadrature on the master crank pin bearing assembly or by the use of planetary gears, my invention ensures this result by the simple expedient of linking together by means of link 44 two of the opposite knuckle pins 36a and 36b so that the angle of these knuckle pins 36a and 36b with respect to a diameter through the crank pin will always remain the same.

This angle data may be such for each of the two opposite connecting rods 35a and 35b that these rods are always held at 180° from each other.

It has been found, however, that by rotating crank pin bearing assembly 25 a very small amount such as 2° with respect to the diameter will reduce the forces reacting against the two cylinders carrying the master rods 35a and 35b. If this angle is held at 2° or at an appropriate angle determined by experiment for any particular engine, the torque will always be in one direction.

The torque which is present is naturally that tending to rotate the master crank pin bearing assembly 25 during its translatory movement.

The function of the master connecting rods 35a, 35b, their respective knuckle pins and their cranks 42 and connecting link 44 is to prevent this rotation while permitting the translatory movement to occur. This rotational torque will tend to reverse itself at times so that the torque is not inherently uni-directional, thereby setting up excess stresses on the connecting rods 35a and 35b.

I have found, however, that a particular angle of lag which may be of the order of 2° as shown will tend to result in a uni-directional torque on the master crank pin bearing assembly 25.

Thus, by my novel and simplified linkage integrating two of the opposite knuckle pins to maintain an exact angular relation with each other, the gyratory or translatory motion of the master crank pin bearing assembly 25 is maintained while rotational movement thereof is prevented.

My invention by displacing the link 44 axially of the bearing rather than radially of the bearing permits the curvature of the arc in the link to be greatly reduced so that it will pass over the crank only without having to pass around the entire bearing.

Since the forces on the link are entirely compressive and, therefore, since they act along the chord of the arc, the reduction in curvature of the arc which is achieved permits increased strength.

The positioning of the link 44 in my invention so that it extends around the crank shaft rather than around the bearing permits the link to be widened as much as may be necessary to resist all compressive loads or thrusts without going beyond the confines of the machine where it may interfere with the cylinders.

The axial displacement of my link 44 rather than the radial displacement of the link permits the link to be given any desired thickness or structural configuration which may be necessary to resist the compressive thrusts.

Such an increase in thickness would only require a corresponding lengthening of the eccentric portion of the crank shaft since in most engines some slight longitudinal lengthening can be done without increases in overall size, while radial lengthening requires a complete redesign of the machine.

In addition, and this is of the essence in the present invention, the use of an odd number of cylinders and knuckle pins provides an additional problem in maintaining the master link 44 continuously oriented. This is so because, with an odd number of cylinders, piston rods and knuckle pins, the link 44 would oscillate slightly during each revolution because knuckle pins 3 and 9 are not exactly diametrically opposite.

To solve this problem, I provide at knuckle pin 6 an additional crank 50 fixed to said knuckle pin so that it will always maintain a fixed angular relation to the piston rod associated with said knuckle pin 6.

Pin 43 on crank 42 carries an eccentric 46. Auxiliary link 51 is journaled at pin 52 of crank 50. The other end of auxiliary link 51 is journaled on pin 54 of crank 55 and eccentric 46 which are a unitary structure. The eccentric 46 is mounted on pin 43 and is so arranged that the normal swing of any of the rods and knuckle pins through a maximum of 25° will be compensated for by the off-center position of the eccentric so that auxiliary link 51 will continuously adjust main link 44 to maintain a constant orientation of link 44. The initial position and the eccentricity of the eccentric 46 is arranged so that shift in orientation of link 44 during its translatory motion will thereby be obviated.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In a radial engine having an odd number of radially arranged cylinders, a piston individual to each cylinder; a connecting rod individual to each piston; a crank shaft having a crank pin; a bearing on said crank pin; a knuckle pin individual to each connecting rod and connecting each connecting rod to said bearing; a link axially displaced from said bearing; a pair of knuckle pins each having a crank; said link connecting the cranks of said pair of knuckle pins; and a third crank member connected to a third knuckle pin; a fourth crank member eccentrically connected to the point of connection of the link with one of said first two crank members; and an auxiliary link between the outer ends of the third and fourth crank members.

2. In a radial engine having an odd number of radially arranged cylinders and a piston individual to each cylinder, a connecting rod individual to each piston, a crank shaft having a crank pin, a bearing on said crank pin, a knuckle pin individual to each connecting rod and pivotally connecting each connecting rod to said bearing, two of said knuckle pins having cranks at their ends, and an elongated link axially displaced from said bearing, said link connecting said cranks, said link being apertured closely to surround the crank pin and having adjacent each end a pivotal connection with one of said cranks, and a third crank member connected to a third knuckle pin; a fourth crank member eccentrically connected to the point of connection of the link with one of said first two crank members; and an auxiliary link between the outer ends of the third and fourth crank members.

3. In a radial engine having an odd number of radially arranged cylinders and a piston individual to each cylinder, a connecting rod individual to each piston, a crank shaft having a crank pin, a bearing on said crank pin, a knuckle pin individual to each connecting rod and pivotally connecting each connecting rod to said bearing, two of said knuckle pins having cranks at their ends, and an elongated link axially displaced from said bearing, said links connecting said cranks; said link being apertured closely to surround the crank pin and having adjacent each end a pivotal connection with one of said cranks, and means connected between said bearing and said link for maintaining the orientation of said link constant; said means comprising a third crank member connected to a third knuckle pin; a fourth crank member eccentrically connected to the point of connection of the link with one of said first two crank members; and an auxiliary link between the outer ends of the third and fourth crank members.

4. In a radial engine having an odd number of radially arranged cylinders and a piston individual to each cylinder, a connecting rod individual to each piston, a crank shaft having a crank pin, a bearing on said crank pin, a knuckle pin individual to each connecting rod and pivotally connecting each connecting rod to said bearing, two of said knuckle pins having cranks at their ends, and an elongated link axially displaced from said bearing, said link connecting said cranks; said link being apertured closely to surround the crank pin and having adjacent each end a pivotal connection with one of said cranks, and means connected between said bearing and said link for maintaining the orientation of said link constant; said means comprising a crank on a third knuckle pin, a crank eccentrically pivoted to said link, a link connecting said crank on said third knuckle pin to said eccentrically pivoted crank.

References Cited in the file of this patent

UNITED STATES PATENTS

| | | |
|---|---|---|
| 1,991,657 | Chevrolet | Feb. 19, 1935 |
| 2,160,444 | Schubert | May 30, 1939 |
| 2,584,098 | Bohn | Jan. 29, 1952 |

FOREIGN PATENTS

| | | |
|---|---|---|
| 480,156 | France | Mar. 31, 1916 |